(12) United States Patent
Erb (10) Patent No.: US 6,577,982 B1
(45) Date of Patent: Jun. 10, 2003

(54) MODEL-BASED TESTING VIA COMBINATORIAL DESIGNS

(75) Inventor: David Erb, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 106 days.

(21) Appl. No.: 09/774,149

(22) Filed: Jan. 30, 2001

(51) Int. Cl.⁷ .................................................. G06F 11/00
(52) U.S. Cl. ........................................ 702/120; 707/10
(58) Field of Search ................................ 702/120, 122, 702/123, 182–184, 185, 186, 188; 707/2, 10, 103 R, 104.1, 201–203; 714/100, 1, 25, 27, 28, 35–39, 40–41, 48, 52

(56) References Cited

U.S. PATENT DOCUMENTS

| | | | | |
|---|---|---|---|---|
| 4,696,003 A | * | 9/1987 | Kerr et al. | 714/38 |
| 5,421,004 A | * | 5/1995 | Carpenter et al. | 714/32 |
| 5,579,476 A | * | 11/1996 | Cheng et al. | 714/32 |
| 5,604,895 A | * | 2/1997 | Raimi | 703/13 |
| 5,805,795 A | * | 9/1998 | Whitten | 714/32 |
| 5,892,947 A | * | 4/1999 | DeLong et al. | 703/22 |
| 6,038,378 A | * | 3/2000 | Kita et al. | 714/38 |
| 6,041,330 A | * | 3/2000 | Carman et al. | 707/1 |
| 6,148,277 A | * | 11/2000 | Asava et al. | 379/10.03 |
| 6,205,575 B1 | * | 3/2001 | Sherman et al. | 345/967 |
| 6,219,829 B1 | * | 4/2001 | Sivakumar et al. | 717/131 |
| 6,336,217 B1 | * | 1/2002 | D'Anjou et al. | 707/203 |
| 6,415,396 B1 | * | 7/2002 | Singh et al. | 714/38 |

OTHER PUBLICATIONS

Huo Yan Chen, et al.; "ROCS: An Object–Oriented Class–Level Testing System Based on the Relevant Observable ContextS Technique", *Information and Software Technology*, vol. 42, No. 10, 2000, p. 677–686.

Paul E. Black, "Modeling and Marshaling: Making Tests from Model Checker Coutnerexamples", IEEE, Digital Avionics System Conference. Proceedings., vol. 1, p. 1.B.3–1–1.B.3–6.

Brian J. Taylor, et al.; "Regressive Model Approach to the Generation of Test Trajectories", IEEE, Proceedings 3rd IEEE Symposium on Application–Specific Systems and Software Engineering Technology, 2000, p. 49–56.

Chien–Hung Liu, et al.; "Structural Testing of Web Applications", *Proceedings Eleventh International Symposium on Software Reliability Engineering*, 2000, p. 84–96.

Taylor, B.J., et al.; "Evaluation of Regressive Methods for Automated Generation of Test Trajectories", *Proceedings Eleventh International Symposium on Software Reliability Engineering*, 2000, p. 97–109.

Peraire, C., et al.; "Test Selection for Object–Oriented Software Based on Formal Specifications", *Programming Concepts and Methods. PROCOMET '98. IFIP TC2/WG2.2, 2.3 International Conference*, 1998, p. 385–403.

(List continued on next page.)

Primary Examiner—Marc S. Hoff
Assistant Examiner—Edward Raymond
(74) Attorney, Agent, or Firm—Amin & Turocy, LLP (57) ABSTRACT

The present invention provides systems and methods for generating sets of test cases and extends to the sets of test cases and processes using the sets of test cases to develop applications. One aspect of the invention provides a data structure for efficiently storing a set of variable value combinations among which the number of variables can vary. Another aspect of the invention provides systems and methods for sequentially generating test cases to encompass a set of variable value combinations. Advantages of the invention include permitting efficient generation of near minimal sets of test cases that include specified variable value combinations, among which the number of variables can vary, and seed test cases. Sets of test cases produced by the invention are distinctive and have practical value in processes for application development. The test cases permit more efficient and thorough testing of applications, which results in better applications.

27 Claims, 7 Drawing Sheets

OTHER PUBLICATIONS

Burr, et al.; "Combinatorial Test Techniques: Table–based Automation, Test Generation and Code Coverage", p. 1–12.

Huller, Jerry; "Reducing Time to Market with Combinatorial Design Method Testing", p. 1–8.

Sherwood, George; "Effective Testing of Factor Combinations", Third International Conference on Software Testing, Analysis & Review, May 8–12, 1994, p. 133–166.

Holzmann, et al.; "Automating Softwrae Feature Verification", Bell Labs Technical Journal, Apr.–Jun. 2000, p. 72–87.

Robinson, Harry; "Graph Theory Techniques in Model–Based Testing", Presented at the 1999 International Conference on Testing Computer Software, http://www.geocities.com/harry robinson testing/graph theory.htm, viewed Jun. 12, 2000, p. 1–13.

Robinson, Harry; "Finite State Model–Based on Testing a Shoestring", Presented at STAR West 1999, http://geocities.com/model based testing/shoestring.htm, viewed on Jun. 12, 2000, p. 1–13.

Telcordia Technologies; "AR Greenhouse: Frequently Asked Questions", http://aetgweb.argreenhouse.com/FAQ/FAQ.html, p. 1–2.

Telcordia Technologies; "AR Greenhouse: Selected Paper References", http://aetgreenhouse.com/papers.html, p. 1–2.

Mandl, Robert, "Orthogonal Latin Squares: An Application of Experiment Design to Compiler Testing", Communications of the ACM, vol. 28, No. 10, Oct. 1985, p. 1054–1058.

Thomason, et al.; "Rare Failure–State in a Markov Chain Model for Software Reliability", Proceedings Tenth International Symposium on Software Reliability Engineering, 1999, p. 12–19.

Telcordia Technologies, "Automatic Generation of Efficient Tests", p. 1–4. (1999).

Dalal, S.R., et al.; "Model–Based Testing of a Highly Programmable System", Proceedings of ISSRE '98, Nov. 5–7, 1998, p. 174–178.

Hill, Jo Ann; "Model–Based Testing", Home Page of Jo Ann Hill—CIS841–Software Validation & Verification; (Fall 1999), Chapter 5.

Tai. K.C., et al.; "A Test Generation Strategy for Pairwise Testing", Submitted to IEEE Transactions on Software Engineering, p. 1–18.

Cohen, et al.; "The Combinatorial Design Approach to Automatic Test Generation", IEEE Software, Sep. 1996, p. 83–88.

Cohen, et al.; "The Combinatorial Design Approach to Automatic Test Generation", IEEE Software, http://www.argreenhouse.com/papers/gep/AETGissre96.shtml, Viewed May 18, 2000, p. 1–10.

Cohen, et al.; "The AETG System: An Approach to Testing Based on Combinatorial Design", IEEE Transactions on Software Engineering, vol. 23, No. 7, Jul. 1997, p. 437–444.

Dalal, S.R., et al.; "Model–Based Testing in Practice", Proceedings of ICSE '99, May 1999, p. 1–10.

* cited by examiner

MODEL-BASED TESTING VIA COMBINATORIAL DESIGNS

TECHNICAL FIELD

The present invention generally relates to software development tools and relates in particular to a system and method for generating test cases.

BACKGROUND OF THE INVENTION

Many systems, whether mechanical, software, or some combination thereof, have large numbers of independent variables, which are parameters relating to factors such as, for example, system configuration, system input, and the environment in which the system is used. These systems may be tested to detect errors and correct underlying system faults. Many system failures, however, occur only upon coincidence of several variable values and exhaustive testing of all variable value combinations is often unfeasible due to the sheer number of possible combinations.

Combinatorial design is a practicable approach to testing systems with large numbers of independent variables. In combinatorial design, test cases are typically chosen to include all interactions among limited groups of independent variables. For example, a group of test cases can be generated in which all possible pairs of variable values appear in at least one test case. Generating near minimal sets of test cases covering specified combinations of variable values, however, proves to be very difficult in all but the simplest of cases.

There exist several approaches to generating test cases for combinatorial design. Orthogonal arrays or Latin squares have been widely used. These techniques were developed for experimental design and have symmetry requirements that are not conducive to generating near minimal sets of test cases. In addition, while orthogonal array-based methods can generate test cases covering all pair-wise variable combinations, or all three-way variable combinations, orthogonal array-based methods are unsuitable for mixed-order models. A mixed-order model is one specifying, for example, the some variable groups be tested in three-way combination while other variable groups only require pair-wise testing.

In recent years a graph-theoretic approach based on an adjacency matrix representation has come into use. This approach generates near minimal sets of test cases, but like orthogonal array-based approaches, is limited to fixed-order models. An additional limitation of the graph-theoretic approach is that it has very large system resource requirements. The memory requirement increases with the number of independent variables taken to the power of the model order. Processing time also increases dramatically for higher order models.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods for generating sets of test cases and extends to the sets of test cases and processes using the sets of test cases to develop applications. One aspect of the invention provides a data structure for efficiently storing a set of variable value combinations among which the number of variables can vary. Another aspect of the invention provides systems and methods for sequentially generating test cases to encompass a set of variable value combinations. Advantages of the invention include permitting efficient generation of near minimal sets of test cases that include specified variable value combinations, among which the number of variables can vary, and seed test cases. Sets of test cases produced by the invention are distinctive and have practical value in processes for application development. The test cases permit more efficient and thorough testing of applications, which results in better applications.

One aspect of the invention provides a system for generating a set of test cases comprising a component for obtaining a set of variable value combinations to be included in the set of test cases. The number of variables is permitted to vary among the variable value combinations. The system further comprises a component for sequentially generating test cases to fill out the set of test cases. The test cases are generated with reference to the set of variable value combinations and which of the variable value combinations in the set do not appear in any previously generated test case.

A further aspect of the invention provides a computer-readable medium having stored thereon a data structure for use in generating sets of test cases for systems having a plurality of independent variables. The data structure comprises a list of combination structures, wherein each combination structure comprises a structure for identifying independent variables to which the combination structure corresponds.

A further aspect of the invention provides a method for generating a set of test cases comprising obtaining a set of variable value combinations to be included in the set of test cases, wherein the number of variables is permitted to vary among the variable value combinations, and sequentially generating test cases to fill out the set of test cases, wherein the test cases are generated with reference to the set of variable value combinations and which of the variable value combinations in the set do not appear in any previously generated test case.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

In the following description, the phrase "variable combination" refers to a set of variables, without reference to values. For example, the variables B, C, and E together form a variable combination. The phrase "variable value combination" refers to a variable combination with a particular set of values. For example, B=1, C=3, and E=0 together form a variable value combination.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable.

Figure 1:
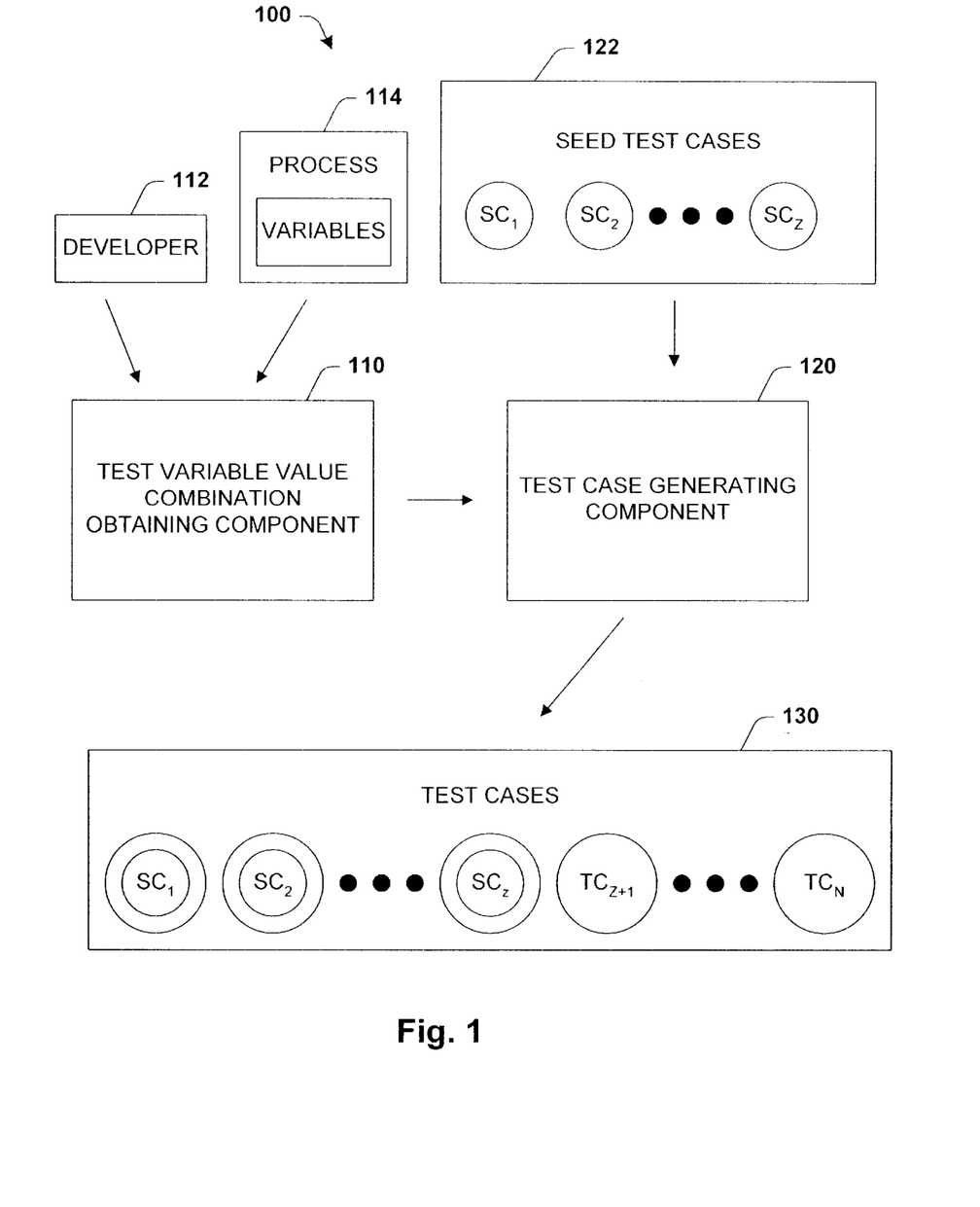
FIG. 1 is a high level schematic illustration of a system for generating sets of test cases in accordance with one aspect of the present invention present invention.

FIG. 1 is a high level schematic illustration of a system 100 for generating a set of test case according to one aspect of the present invention. The set of test cases can be used to test a system and in particular to detect faults that occur when certain variable values appear in combination. Component 110 receives input from developer 112 and information regarding system 114 and produces a list of variable value combinations to be included in the set of test cases. Component 120 take the list of variable value combinations, and optionally, a group of partial seed cases 122, and generates a set of test cases 130, which include all the variable value combinations. Testing system 114 with the resulting set of test cases will generally reveal whether one or more of the specified variable value combinations, or one or more of those variable value combinations appearing among partial seed cases 122, causes a fault.

System 114 is not limited to any particular type. For example, system 114 can be a software application, a hardware system, or a system containing both software and hardware components. System 114 can be, for example, a process, a computer program, a machine, or a strategy. System 114 can be, without limitation, a word processor, a mail program, an operating system, a computer, a laser-cutting machine, a telephone system, an inventory management system, a grocery store scanner, a medical diagnostic expert system, an NMR image processing system, an oil reservoir simulator, an automobile, a missile guidance system, an agricultural pest management system, a financial management system, or a robot. As illustrated by the forgoing list, the invention can be applicable for use with virtually any type of system. The invention is particularly applicable to systems in which exhaustive testing is impractical due to a large number of possible variable value combinations.

The variables of system 114 include all those factors that can affect the operation or outcome of system 114. Variables of system 114 can include parameters relating to how system 114 is configured, what inputs system 114 receives, and the environment in which system 114 is used. For example, if system 114 is a computer program, variables of system 114 can include, without limitation, the platform on which the computer is run (operating system type, processor type, bus type, display type, total memory, available memory, etc.), variables relating to how the program is complied (compiler type, compiler flags, compile time options provided by the program itself), options selected by the user, type and order of inputs provided by the user, and outside events that occur during program operation. If system 114 is a laser cutting machine, variables can include, without limitation, machine type, power level, beam focus, material being cut, thickness of material, dimensions of material, surface texture, surface coatings, rate of cutting, ambient temperature, ambient humidity, exhaust fan speed, etc.

The variables of system 114 each have two or more possible values. The values can be numerical, but are commonly not. Where the number of possible values for a variable is infinite or substantial in number, a finite set of values is selected for purposes of testing.

Component 110 receives information regarding system 114 and specifications from developer 112. Component 110 combines the information regarding system 114 with the specifications from developer 112 to obtain a list of variable value combinations. Each variable value combination in the list is to be covered by at least one test case. Developer 112 can be, without limitation, a person, such as a member of a group that developed system 114, a system tester who took no part in the development process, or an automated component. Information regarding system 114 is information arising from the structure of system 114, without any particular distinction as to which variable combinations or values are more relevant, interesting, or more likely to cause faults than others. Information regarding system 114 can include, for example, a list of the variables in system 114 and lists of possible values for each variable. The information regarding system 114 required by component 112 varies depending on how the variable value combinations are to be determined and the details provided by developer 112. All the information required by component 110 can come from developer 112 and no other source of information may be required. Test case generating system 100 is illustrated with data for component 110 coming from two sources solely to emphasize that the detail of specification provided by developer 112 can vary.

The manner and detail with which developer 112 provides specifications is not limited to any particular form. For example, developer 112 can supply a list of values for each variable and specify that every pair wise, three-way, four-way, or n-way (nth order) combination of variable values is to be tested. But, and herein lies one of the advantages of the present invention, developer 112 can also specify that some variables are to be tested in every n-way combination while other variables are to be tested in every m-way combination, with m and n being two different numbers. For example, for one set of variables the developer can specify that every four-way combination is to be tested, while for others, every three-way combination is to be tested, and for still others, every pair-wise combination is to be tested. In one aspect of the invention, developer 112 specifies an order, n, separately for each variable, whereby the list of variable value combinations is to include combinations of that variable with all possible combinations of n−1 other variables specified as order n or higher. Alternatively, developer 112 may specify an order n whereby the list of variable value combinations is to includes all combinations of n variables, with the additional specification of specific combinations of variables in sets of more than n variables, so that the list of variable value combinations will also include the additional specified combinations.

Test case generating system 100 permits developer 112 to specify the variable combinations in an arbitrary, detailed, and/or complicated fashion. For example, according to another aspect of the invention, developer 112 specifies different values to be used for a particular variable, depending on which combination the variable appears in. In a further aspect of the invention, the set of values used depends on the order of the combination (second, third, etc.). For example, developer 112 can specify one set of values to use for a variable in every two-way combination including the variable, and another, perhaps smaller set of values, to be used in every three-way combination including the variable. Specifically, developer 112 can specify 2 values for a variable to use in three-way combinations that include that variable and 5 values for the variable to use in two-way combinations that include that variable. This permits a developer to increase the efficiency with which testing is carried out. For example, it may not be necessary to test all possible value for a variable in three-way combinations, while it is still of interest to test all possible values for that variable in lower order combinations.

When it is convenient, developer 112 can provide a plurality of different specifications. For example, one specification can arise from one group of developers or from one testing methodology while another group of developers can provide a specification based on different criteria. Component 112 can assimilate a plurality of specifications to obtain the list of test variable value combinations.

It is advantageous for component 110 to eliminate redundancies that arise from one or more variable value combination specifications. Redundancies occur when one variable value combination is a subset of another variable value combination having an equal or greater number of variables. Eliminating redundancies simplifies and clarifies the test case generating problem and results in more efficient test case generation.

Figure 2:
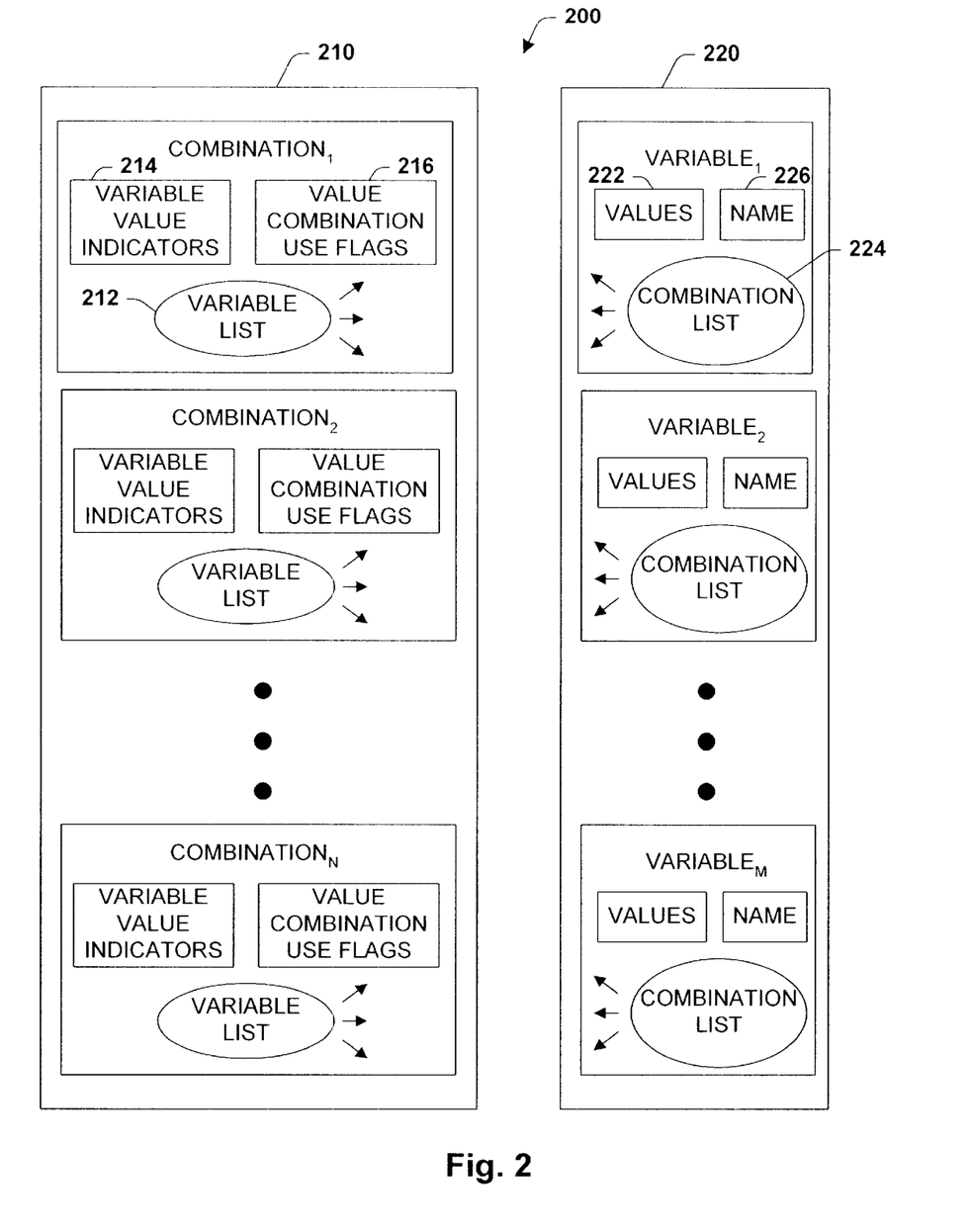
FIG. 2 is a schematic illustration of a data structure in accordance with another aspect of the present invention.

The implementation of complex variable value combination specifications is facilitated by a further aspect of the present invention, which provides a data structure for storing a list of variable value combinations. FIG. 2 is a schematic illustration of a data structure 200 in accordance with this aspect of the present invention. Data structure 200 has a component 210 for storing a list of the variable combinations for which combinations of values to be tested have been specified. Component 210 has one element for each variable combination. The elements can be organized and stored in any suitable fashion, for example as an array, a linked list, or a doubly linked list.

There are several advantages to a data structure such as data structure 200. Unlike prior art data structures used in combinatorial design, data structure 200 permits storing variable value combinations with differing numbers of variables. Moreover, the storage requirement of data structure 200 does not increase rapidly with increasing combination order. Large storage requirements have been a hindrance in running high order models in prior art combinatorial design systems. The storage requirement of data structure 200 is linear in the number of variable combinations and remains proportion to the number of variable combinations, regardless of the orders of the combinations stored.

Each of the elements in component 210 has a structure 212 indicating the variables in the combination and a structure 214 indicating values for the variable combination. In the particular example provided by FIG. 2, structure 212 indicates the variables with a list of pointers to elements of component 220, which is a data structure with elements corresponding to individual variables. Structure 212 can indicate the variables in the combination in other ways as well. For example, structure 212 can comprise a list of indexes that uniquely identify the variables.

Structure 214 identifies the value combinations associated with the variables indicated by structure 212. As with structure 212, which identifies the variables, structure 214 can utilize any suitable organization. The structure used depends on the flexibility desired for the system employing structure 200. For example, if it can be assumed that all possible value combinations are to be tested, a list of the values can be provided, one for each variable in component 220, and structure 212 can be omitted entirely. In such a case, the value combinations for each variable combination are determined by finding all possible combinations of the values in component 220. A more flexible approach is to provide lists of values for each variable in structure 212. This approach permits different lists of variable values to be used for different variable combinations. This structure is still not the most flexible, however, in that it generally involves the assumption that every possible combination of the listed values is to be tested.

Structure 214 can specifically list the variable value combinations. For example, structure 214 can be a list of the variable value combinations stored as an array with the rows corresponding to different value combinations and the columns corresponding to the variables. Another flexible approach involves listing all possible values for each variable in component 220, and having structure 214 provide a matrix of flags. The matrix can have one dimension for each variable and the flags can be either 0 or 1, with a value of 1 meaning that the value combination corresponding to that spot in the matrix is one of those value combinations that is to be included in the set of test cases.

In addition to structures 212 and 214, it is convenient to provide the elements of structure 210 with a structure 216 that can be used to track which variable value combinations have not been used in any previously generated test case (are unfilled). The structure for this component is again flexible, although a matrix of flags is convenient and can provide for efficiencies during test case construction. For example, with a matrix of flags, it can rapidly be determined how many unfilled value combinations there are corresponding to a particular variable value. The use of structure 216 will be evident from the discussion of methods of generating test cases, which follows.

Figure 3:
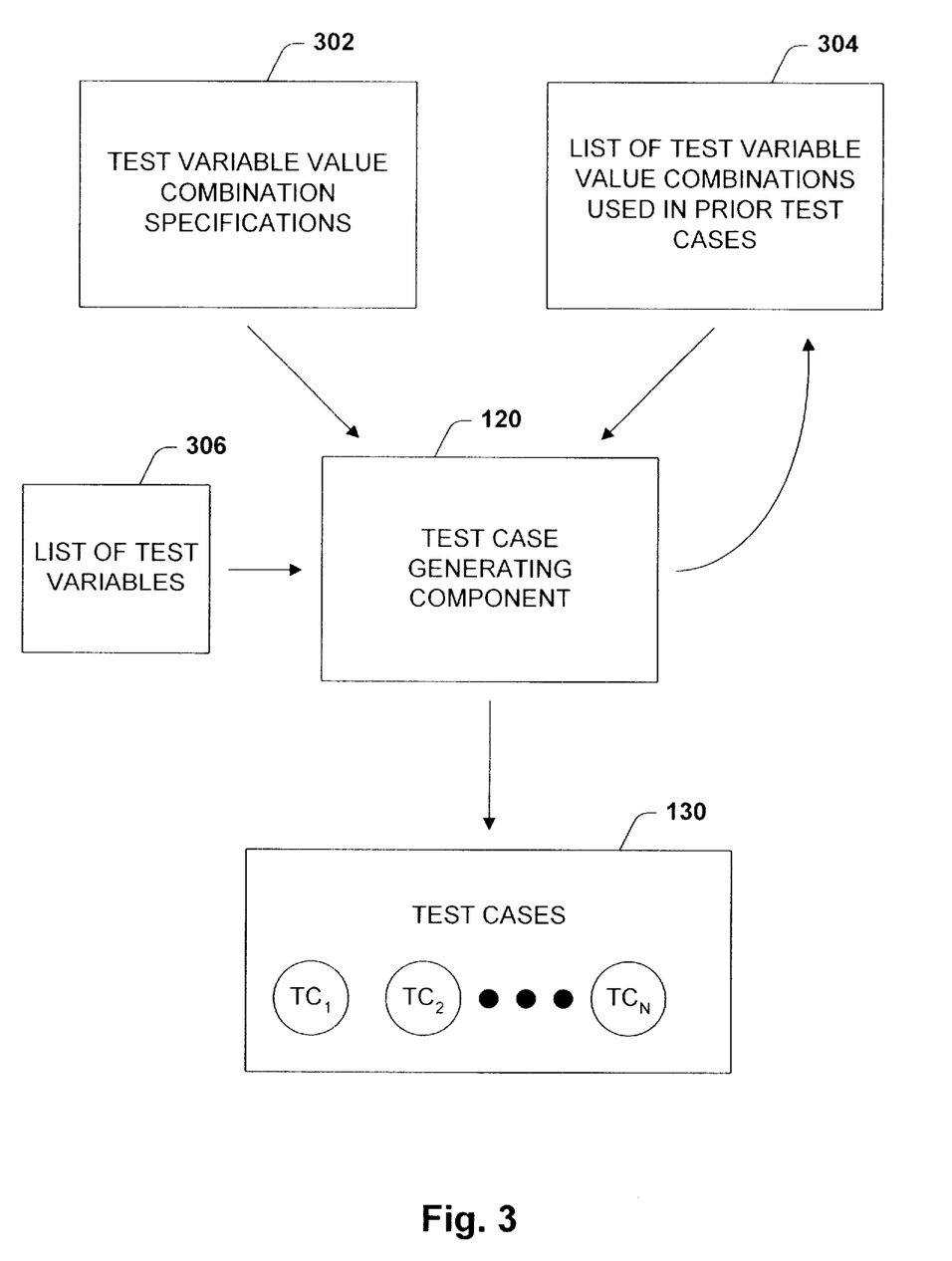
FIG. 3 is a schematic of a system for sequentially generating test cases in accordance with a further aspect of the present invention.

As illustrated by FIG. 3, which is a high level schematic illustration, component 120 receives a list of variable value combinations 302, which can be stored in data structure 200 (FIG. 2), and sequentially generates test cases to form a set of test cases 130. New test cases are generated with reference to those variable value combinations that do not appear in any of the previously generated test cases 304. The previously generated test cases optionally include seed test cases 112, as illustrated in FIG. 1, as well as test cases generated by component 120. The sets of test cases generated by the invention from seed cases (or partial seed cases) are near minimal subject to the constraint that the resulting set of test cases includes the seed cases. Without seed cases, the resulting set of test cases is generally smaller. However, a developer may wish to include seed cases for a variety of reasons. For example, the developer may have used the seed cases previously and developed a level of confidence in their ability to root out faults. Such seed cases may arise out of testing a prior version of the system. Another example is where the seed cases represent common circumstances in which the system will be used. It is often desirable to give special attention to such circumstances during testing.

Generating a test case involves assigning a value for each of the test variables 306. The manner and method of assigning variables values to build the test cases affects the number of test cases in the resulting set of test cases 130.

One aspect of the present invention that contributes towards keeping the number of test cases close to a minimum is a method of selecting the first variable values to assign in a new test case. The first variables assigned are from a variable combination having the most variable value combinations that do not appear in any previously generated test case (are unused). There may be several such variable combinations. Where there are several, one is chosen arbitrarily or randomly. An unused value combination corresponding to the variable combination is chosen. This choice can also be made arbitrarily or randomly. The chosen variable's value combination is assigned in the test case.

Figure 4:
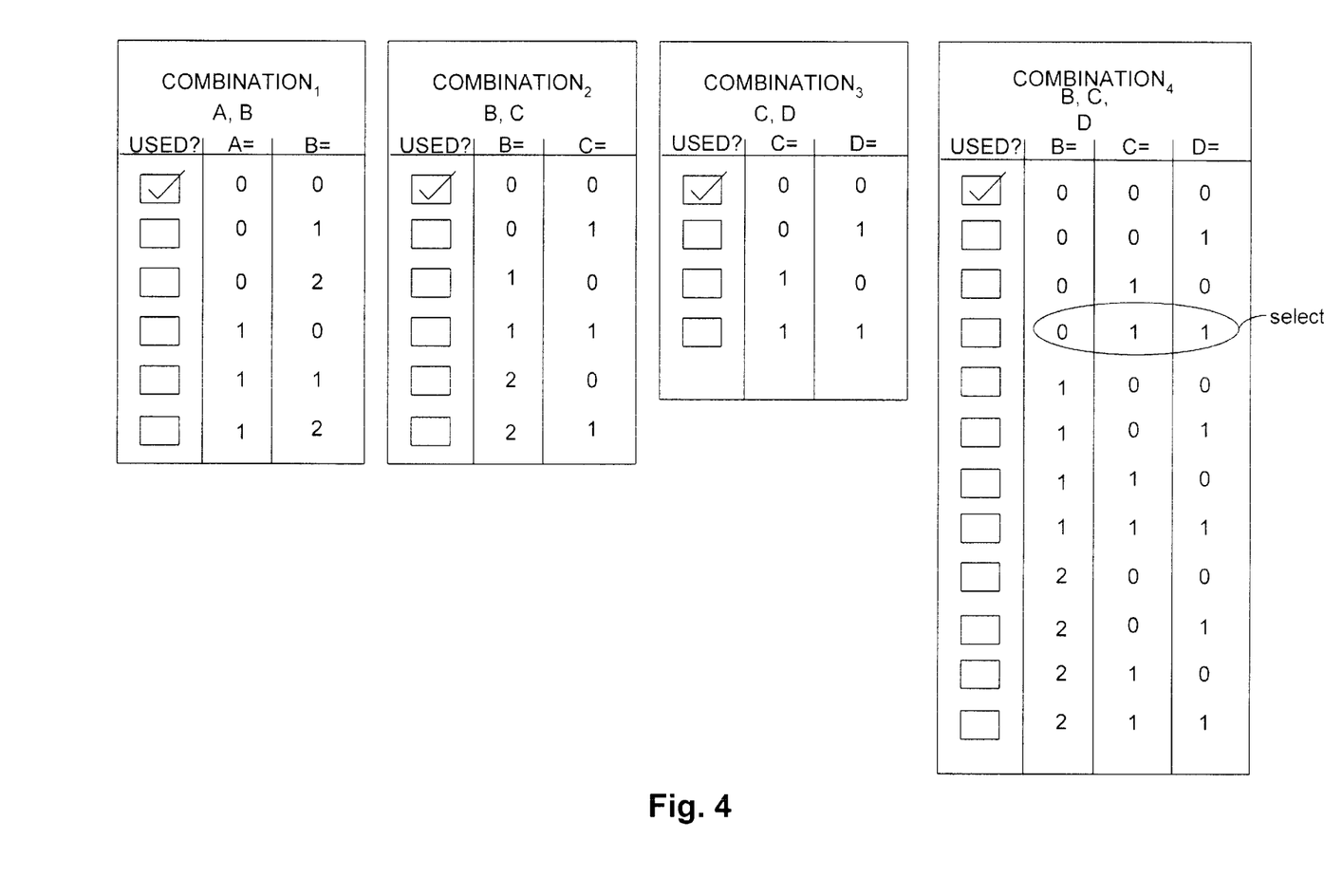
FIG. 4 is a schematic illustration of a method for selecting first variable values to assign in a new test case according to a further aspect of the present invention.

FIG. 4 provides an example where there are four variables, A, B, C, and D. The variable combinations are AB, BC, CD, and BCD. The corresponding value combinations are shown in the figure. One test case has already been generated in which A=0, B=0, C=0, and D=0. The combination BCD has the largest number of unused value combinations (11). Therefore, the variables B, C, and D are the first to be assigned and a value combination corresponding to these variables is selected. The variable value combination (B=0, C=1, D=1) is randomly chosen. Assigning these three variable values becomes the first step in generating a new test case.

The foregoing method is found in practice to reduce the number of resulting test cases. While this is an experimental result, requiring no explanation, it appears that what this method of selection does is avoid a few variable combinations with a large number of unused value combinations becoming a bottle neck towards forming a complete set of test cases. In general, it appears advantageous to address value combinations of variable combinations having a large number of unused value combinations prior to addressing value combinations of variable combinations having fewer unused value combinations.

Another aspect of the present invention that contributes towards keeping the number of test cases close to a minimum is a method of sequentially selecting additional variable values to fill out a test case. The method begins by selecting a variable to assign a value to. The variable is selected from a list of variables meeting the following criteria:
 i) the variable is unassigned in the test case under construction;
 ii) the variable is the only unassigned parameter in a variable combination;
 iii) a possible value choice for the variable would complete an unused value combination corresponding to a variable combination of part (ii).

Taking the example provided by FIG. 4 with the variable values (B=0, C=1, and D=1) having been set in the test case under construction, the list would include A because A appear in combination with a set variable, B, and there is a combination (A=1, B=0) that can be filled in the test case under construction by a possible choice for A's value (A=1).

An alternative set of criteria for selecting variables to include in the list is used in a variation of the method for sequentially selecting variable values presently being described. The alternative criteria are:
 i) the variable is unassigned in the test case under construction;
 ii) the variable appears in a variable combination together with one or more assigned variables
 iii) a possible value choice for the variable, optionally together with one or more possible values for other unassigned variables, would complete an unused value combination corresponding to a variable combination of part (ii)

A list according to either of the foregoing sets of criteria can be used in the method of sequentially selecting additional variable values to fill out a test case.

According to the method, a variable is selected from the list and a value for the variable is assigned to the test case. The value to assign is chosen from among the possibilities through a series of screening steps. The first screening chooses those possible values for the selected variable that, in combination with set variable values, fill the most unused variable value combinations. In the example of FIG. 4, where A is the selected variable, the possible values for A are 0 and 1. Selecting a value of 0 will not fill any unused value combinations, but selecting a value of 1 will fill 1 unused value combination. Therefore, the value 1 passes the first screen but the value 0 does not.

If there is more than one value passing this first screen, a second screen is applied. The second criteria is to select among the variable values passing the first screen those that appear in the most unused variable value combinations together with set variable values and values for one or more unset variables. For example, where B=0, C=1, and D=1 have been set, and A is the variable from the list for which a value is being chosen, it might be noted that selecting A=1 could fill the variable value combination (A=1, B=0, E=1) together with a set variable value, B=0, and a possible value for another unset variable, E. Therefore, the unfilled variable value combination (A=1, B=0, E=1) would add one towards the count of unused variable value combinations that selecting A=1 could fill together with set variable values and values for one or more unset variables. If A=1, together with set variable values and values for one or more unset variables, could be used in filling the most unused variable value combinations, than A=1 passes the second screen. If there is more than one value passing the second screen, the third screen is applied. The third screen is an arbitrary or random choice.

As with the method for selecting the first variable values to assign in a new case, the foregoing method is found in practice to reduce the number of resulting test cases. Again the result is experimental and does not require any explanation. However, it appears that the method of the invention is effective because it tends towards maximizes the rate at which unused variable value combinations are filled by each new variable value selection and that maximizing this rate tends to minimize the total number of variable selections, and test cases, required to cover all the specified variable value combinations.

There are several useful variations of the foregoing method of sequentially selecting variable values to fill out a test case. These variations involve a trade off between increasing computational time and generating more nearly minimal sets of test cases. These variations may also be explained in terms of maximizing the rate at which new variable value selections fill unused variable value combination. They are more effective because they consider more possible variable value choices and/or they look ahead to consider the best use of several variable value selections at once.

In one of these variations, the variable selection from the list is not random. Instead every variable with every possible value is put through the series of screens. In other words, values for all variables on the list are considered in finding the variable values that if set would fill the largest number of unassigned variable value combinations. Instead of the choice being among values for one variable, e.g., A=0 or A=1, the choice is among values for all variables on the list, which generally includes multiple variables, e.g., A=0, A=1, E=0, E=1, etc. From among those variable values passing the first screen, those that appear in the most unused variable combinations together with the set variable values and one or more other unset variables are selected. From among those passing the second screen, an arbitrary or random selection is made.

A hybrid of the foregoing two approaches to selecting variable values screens values for variables in a sub-set of variables on the list numbering between one and the number of variables on the list. The sub-set can be chosen arbitrarily or randomly. In one example, two variables are arbitrarily selected from the list and put through the screening process. In another example, ten variables, or all the variables on the list if they number ten or less, are randomly selected from the list and put through the screen. This hybrid presents a compromise between considering one variable at a time and considering the entire list at once, the latter being potentially rather time consuming.

Another useful variation involves sequentially selecting variable values two or more at a time. For example, two variables can be selected arbitrarily or randomly from the list. Possible pairs of values for these variables are then run through the series of screens. For example, if the variable A and E are selected form the list, value pairs such as (A=0, E=0) and (A=1, E=1) are put through the screens. To carry out the first screen, those value pairs that can complete the most unused combinations are identified. From among the value pairs passing the first screen, those that participate in the most unused combination together with set variable values and one or more other unset variables are selected. Finally, if necessary, an arbitrary or random selection is made. Values for three, four, or more variables can be screened simultaneously, although the computational requirements increase rapidly as the number of variables being screened at once increases.

As described above, variable values from multiple variable can be screened to select a single variable value and values for a group of variables can be screened to simultaneously select a multiplicity of variable values. A hybrid of these approaches can be used in which multiple combinations of variables are screened to select one combination of variable values to assign. For example, two variable pairs can be randomly selected from the list. Then variable value combinations representing all possible value combinations for the first variable pair and all possible value combinations for the second variable pair can be simultaneously put through the screens. First, the variable and value pairs that fill the most unused value combinations are identified. From among those, the variable and value pairs that fill the most unused value combinations together with one or more unset variable values are selected. Finally, if necessary, a random or arbitrary selection is made. The selected variable pair with the selected values is assigned to the test case.

Another way of making a tradeoff between increasing computational time and generating more nearly minimal sets of test cases is to apply the entire test generation process repeatedly. A foundation for this approach is the occurrence of random selections during the construction of test cases. In this regard, it is advantageous to make a random choice whenever a choice can be made arbitrarily. The entire test generation process is carried out a certain number of times, for example, ten times, twenty times, or fifty times. From among the resulting ten, twenty, or fifty sets of test cases, each of which satisfies the specification, the set with the fewest number of test cases is selected. Running the entire test case selection process repeatedly and selecting the best result generally provides a modest reduction in the total number of test cases.

The foregoing methods of sequentially selecting variable values to assign to a test case also applies to building test cases from partial seed cases. A partial seed case is a seed case that specifies some, but not all, of the test case variables. Starting from a seed case, a new test case can be generated by sequentially selecting values for unset test case variables using any of the foregoing methods.

Alternatively, a partial seed case may be treated as nothing more than a very high order variable value combination. In such a case, the partial seed cases do not receive any special treatment, but are simply included as part of the variable value specification. Usually, the selection between these methods of treating partial seed cases is a matter of convenience, but in some cases the resulting number of test cases is fewer if the partial seed cases are treated like ordinary variable value combination specifications.

The sequential selection of test case variable values provides an opportunity to implement constraints. Constraints are rules prohibiting certain variable combinations from occurring in a test case. Constraints may arise, for example, from functional limitations on the system being tested. To implement the constraints, during the process of selecting variables from the list and assigning them values, an additional screen is applied. If a candidate value or value set would, in combination with set variable values, violate a constraint, the candidate value or value set is excluded from consideration.

Where necessary, the variable value combination specification can be reconciled with a list of constraints in any suitable manner. For example, any variable value combinations that violate one or more constraints can be removed from the list of variable value combinations. Another approach is to treat all variable value combinations that violate one or more constraints as if they had been used in one or more previously generated test cases, for example, by setting a flag that marks the variable value combinations as used. In this regard, variable value combinations that are prohibited need not be distinguished from variable value combinations that have been used in one or more previously generated test cases.

The efficiency of the foregoing methods of sequentially selecting test case variable values can be enhanced by a data structure having elements that correspond to the variables and comprise structures identifying the combinations in which the variables participate. FIG. 2 provides an example—the data structure 200 has a component 220 that has elements corresponding to variables and each element has a structure 224 identifying combinations. The structures 224 can be, for example, lists of pointers or indexes, depending on the manner in which component 210 is organized. The lists can be, for example, linked lists or arrays.

During execution of the methods of sequentially selecting variable values to assign in the test case under construction, the foregoing data structure permits the rapid processing of the several steps. First, in identifying whether a variable is to be added to, or taken off, the list, the structure 224 permits a rapid identification and check of the variable combinations in which the variable appears. Second, structure 224 also permits the rapid counting of the number of variable value combinations that can be filled by a value selection for that variable and also permits a rapid count of the number of variable value combinations that could be filled by that value selection together with selections for one of more un-set variable values. Structures within 220 can also accelerate these steps by facilitating the rapid identification of value combinations associated with a particular variable value and by facilitating rapid determination of which of those variable value combination are unfilled.

The foregoing methods permit the generation of near minimal sets of test cases satisfying variable value combination specifications. A near minimal set typically contains from about 0 to about 40 percent more test cases than the absolute minimum. Near minimal sets of test cases result from the sequential generation of individual test cases according to the foregoing methods of assigning variables values to fill out test cases. These methods of the invention make reference to those of the variable value combinations that do not appear in any previously generated test case.

Where the specified variable value combinations include some variable combinations having greater numbers of variables than others, the resulting sets of test cases are distinctive. A set of test cases produced by the invention may be identified, for example, by determining that the set of test cases covers all possible combinations for certain values in certain variable combinations, that the covered variable combinations are of various orders, and that the number of test cases is of a size that it too small to have resulted if a substantial number of the test cases were generated without making reference to all those of the variable value combinations that do not appear in any previously generated test case. For example, if a set of test cases covering all variable value combination involving three variables is generated without reference to variable value combinations involving two variables, and subsequently the set of test cases is extended to include the variable values combinations involving two variables, it will in general be found that the resulting set of test cases is larger than would have resulted if each test case were generated with reference to all of the variable value combinations.

The sets of test cases produced by the invention have commercial value. They can be prepared on request and supplied to users in the form of data transmissions or computer readable storage media. For example, a client can submit specifications regarding its system and desired variable value combinations to a web site operated by a service that employs methods of the invention. The service can then, for a fee, generate a set of test cases and send them electronically to the client.

The sets of test cases play an important role in a process for developing systems, including, for example, software applications, hardware systems, or systems containing software and hardware components. In general, the development process applies to any system for which the invention can be used to generate test cases. Where exhaustive testing of systems is not feasible, the development process using sets of test cases of the invention results in better systems because more effective testing can be conducted within fixed time and budgetary constraints.

The process of developing the system comprises testing a preliminary version of the system with a set of test cases generated according to a method of the invention. During testing, errors can be identified and corrected in subsequent versions of the system. The subsequent versions of the system can again be tested with the set of test cases generated according to a method of the invention, or can be tested using a new set of test cases. The later course can be desirable when the correction process involves adding new variables to the system or when the testing process provides new insight into the types of variable value combination that can result in faults, in which case a new variable value combination specification may be in order.

Figure 5:
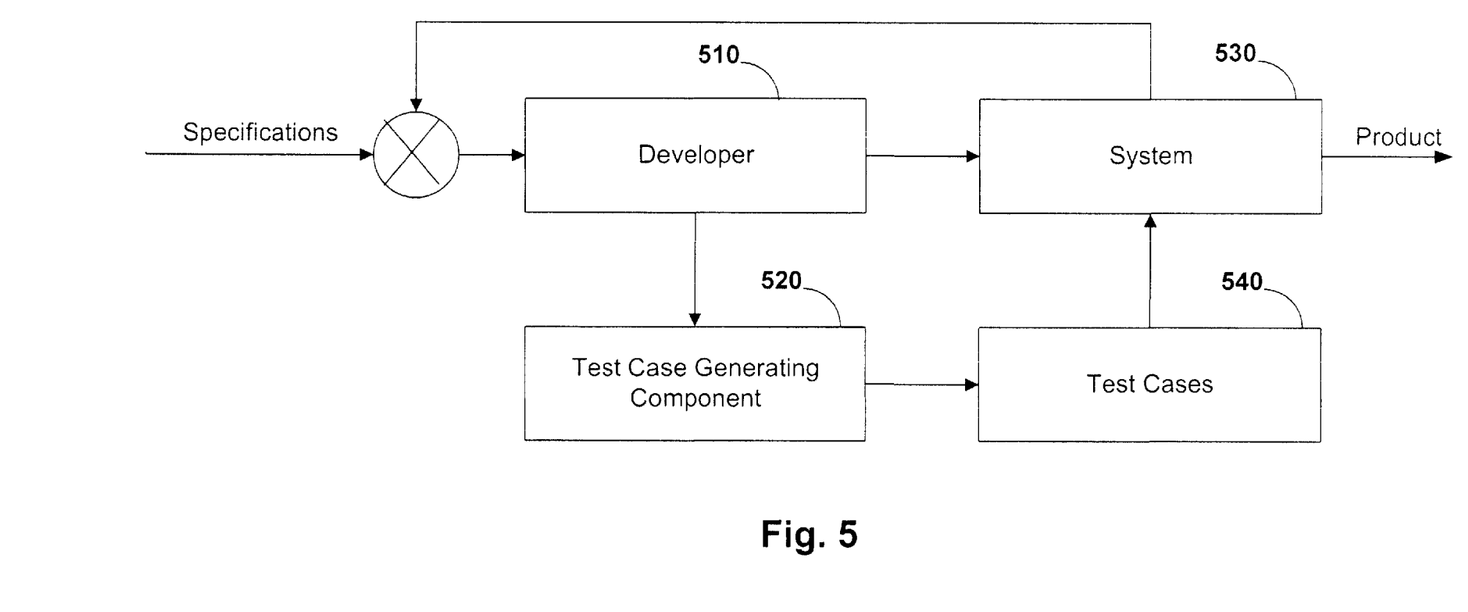
FIG. 5 is a high level schematic illustration of a process for developing systems according to a further aspect of the present invention.

A development process 500 is illustrated in FIG. 5. Developer 510 receives specifications for system 530 and produces a first version of system 530. Developer 510 also provides input to test case generating component 520, which produces test cases 540. System 530 is tested with test cases 540 and developer 510 compares the results are reviewed to detect errors in system 530. The process is repeated until system 530 becomes the finished product.

In some cases, there is greater cost in varying some parameters of a system than there is in varying others. For example, where a system has hardware and software components, it can be more expensive and/or time consuming to run test cases having different hardware configurations than it is to run test cases having different software configurations. For such systems it is useful to build a set of test cases in two stages. In the first stage, a near minimal set of test cases is built employing only those variable value combinations that include costly to vary parameters. These cases are then used as seed cases to build a set of test cases satisfying the complete variable value combination specification.

Using the hardware/software system as an example and assuming that all the variables related to hardware are expensive to vary, a set of test cases is built in the following two stages. First, a set of test cases is built from a variable value combination specification that includes only those variable value combinations that include a variable corresponding to hardware. The test cases in this set are then used as seed cases to build a set of test cases covering all the remaining variable value combinations, restricting combinations of the first group of variables to those created in the first set of test cases. The resulting set of test cases is generally not as small as the set of test cases that would result from building each test case with reference to the entire variable value combination specification. Nonetheless, the larger set of test cases provides more efficient testing in that the larger set of test cases so developed is actually less burdensome to run than the smaller set of test cases that could be produced by treating all the variable value combinations simultaneously.

This process can be extended to use more than one group of related variables in the first step. This process can also be extended to more than two steps, using the results of the previous step at each successive step.

Figure 6:
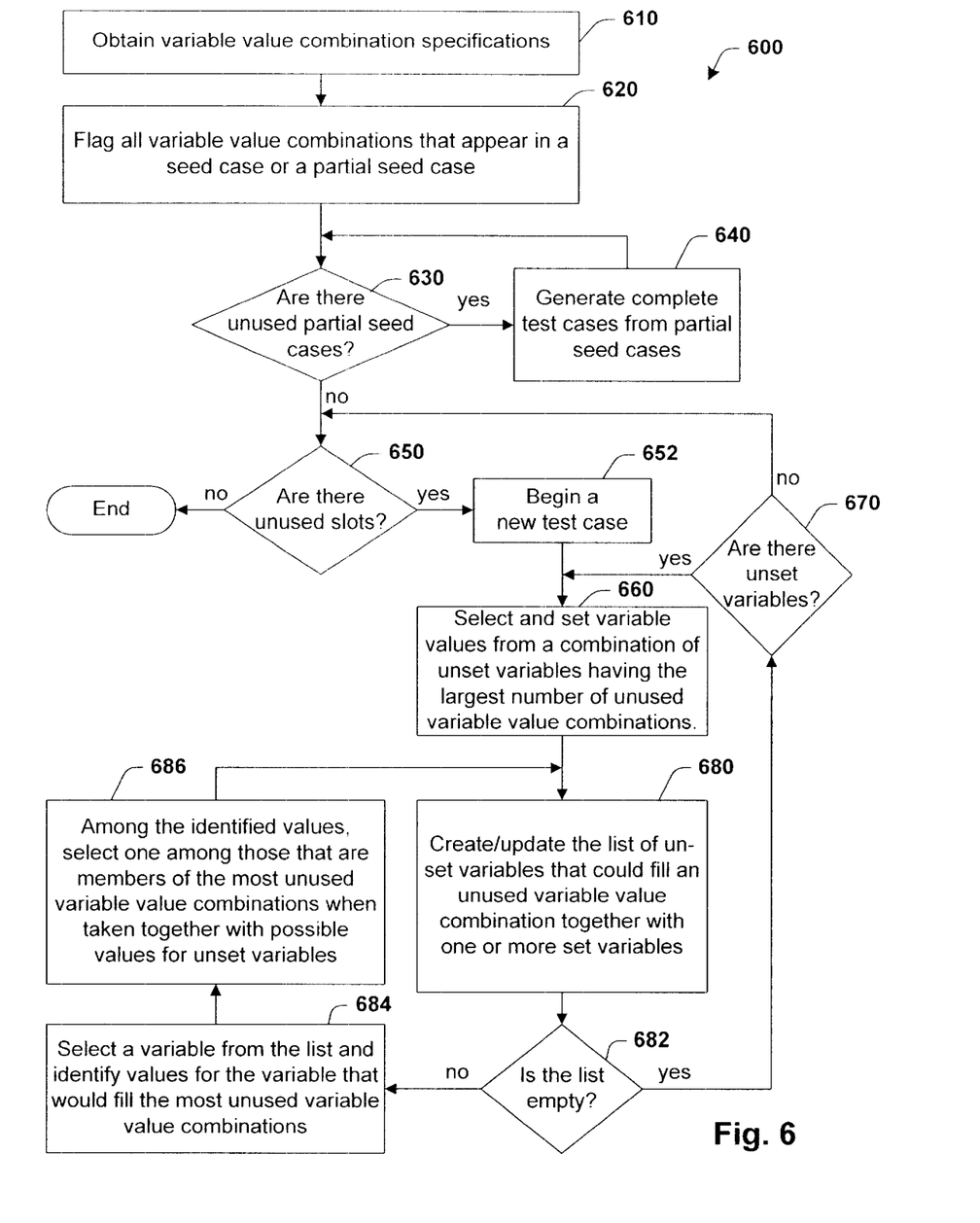
FIG. 6 is a flow diagram illustrating a process for generating test cases in accordance with several aspects of the present invention.

FIG. 6 provides a flow chart of a method 600 for generating test cases incorporating several aspects of the present invention. The process comprises a series of actions that begin with act 610, which is obtaining the variable value combination specifications. These are stored in a data structure such as data structure 200. Act 620 comprises initializations including flagging all those variable value combinations that appear in one or more seed or partial seed cases. In acts 630 and 640, the partial seed cases are sequentially selected and filled out to form complete test cases according to a process comprising acts such as 680, 682, 684, and 686.

In act 650, the determination is made whether more test cases will be needed to cover all the specified variable value combinations. If so, a new test case is begun in act 652. In act 660, which is the first act in generating a new test case, a combination of unset variables is selected. The selected combination is one of those having the largest number of unused variable value combinations. From that variable combination, an unset value combination is randomly selected and those values are assigned to the corresponding variables in the test case.

Act 680 is constructing or updating the list of un-set variables that can be used with one or more set variables to fill an unused variable value combination. Act 682 determines whether there are any variables on the list. If there are variables on the list, one is selected in act 684 and the variable's values are passed through the first screen. This first screen comprises identifying values that would fill the most unused variable value combinations when taken together with set variable values in the current test case.

The second screen is applied in act 686. The second screen is selecting from the values passing the first screen a value that could fill the most unused variable value combinations when taken together with set variable values and possible values for other unset variables. The value selected in act 686 is assigned to the test case and the acts 680 to 686 are repeated while there are variables on the list.

When the list is exhausted, control passes to act 670. Act 670 determines if there are unset variables in the test case. If there are, control passes to act 660 where an unused variable value combination is selected in essentially same manner used to initiate the new test case: an unused variable value combination is selected from the variable combination having the most unused variable value combinations among those variable combinations having un-set variables.

If there are no more unset variables, control passes to act 650 where it is determined whether there are still unused variable value combinations. If there are, a new test case is begun and the process repeated until all variable value combinations have been used.

The following pseudocode implements a method of generating test cases according to the present invention:

```
While (there are unused variable value combinations)
    Initialize all parameters to unbound
    Initialize the work list to empty
    Is there unused seed data?
        yes: bind parameters corresponding to seed data
    While (some parameters remain unbound)
        is the work list empty?
            yes:
                pick an unused variable value combination
                from a variable combination with the most
                unused variable value combinations (and hav-
                ing unbound parameters) bind the correspond-
                ing values
            no:
                pull a parameter from the work list and pick a
                value
```

The following psuedocode can be used when binding a value:

```
Record the value in the test case data structure
Mark the parameter as bound
```

Remove the parameter from the work list
For each combination associated with the parameter if all but one parameter in the combination is bound add the unbound parameter to the work list The following pseudocode can be used to choose the value for a parameter pulled from the work list:
For each possible value of the parameter
 For each combination associated with the parameter
  If the combination only has one unbound parameter and selecting the value would satisfy an unused value combination, add one to the number of value combinations that would be completed by this value
  If the combination has more than one unbound parameter, determine how many unused value combinations could be completed with this value and add the number to a running total
 If the value completes more combinations than any other, or if the value completes as many combinations but could complete more combination together with other unbound values, or if the value completes as many combinations and could completed as many combination together with other unbound values and a random chooser picks it,
  remember this as the current best value
return the best value FIG. 7 and the following discussion provide a brief, general description of a suitable computing environment in which the various aspects of the present invention can be implemented. Methods of the invention may take the form of software tools and computer-executable instructions of a computer program that runs on a computer and/or computers. The methods may also be implemented in combination with other program modules. Generally, program modules include routines, programs, components, data structures, etc. that perform particular tasks and/or implement particular abstract data types.

Various aspects of the invention can take the form of, or be practiced with, computer systems, including single-processor or multiprocessor computer systems, minicomputers, mainframe computers, as well as personal computers, hand-held computing devices, microprocessor-based or programmable consumer electronics, and the like. The illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices.

Figure 7:
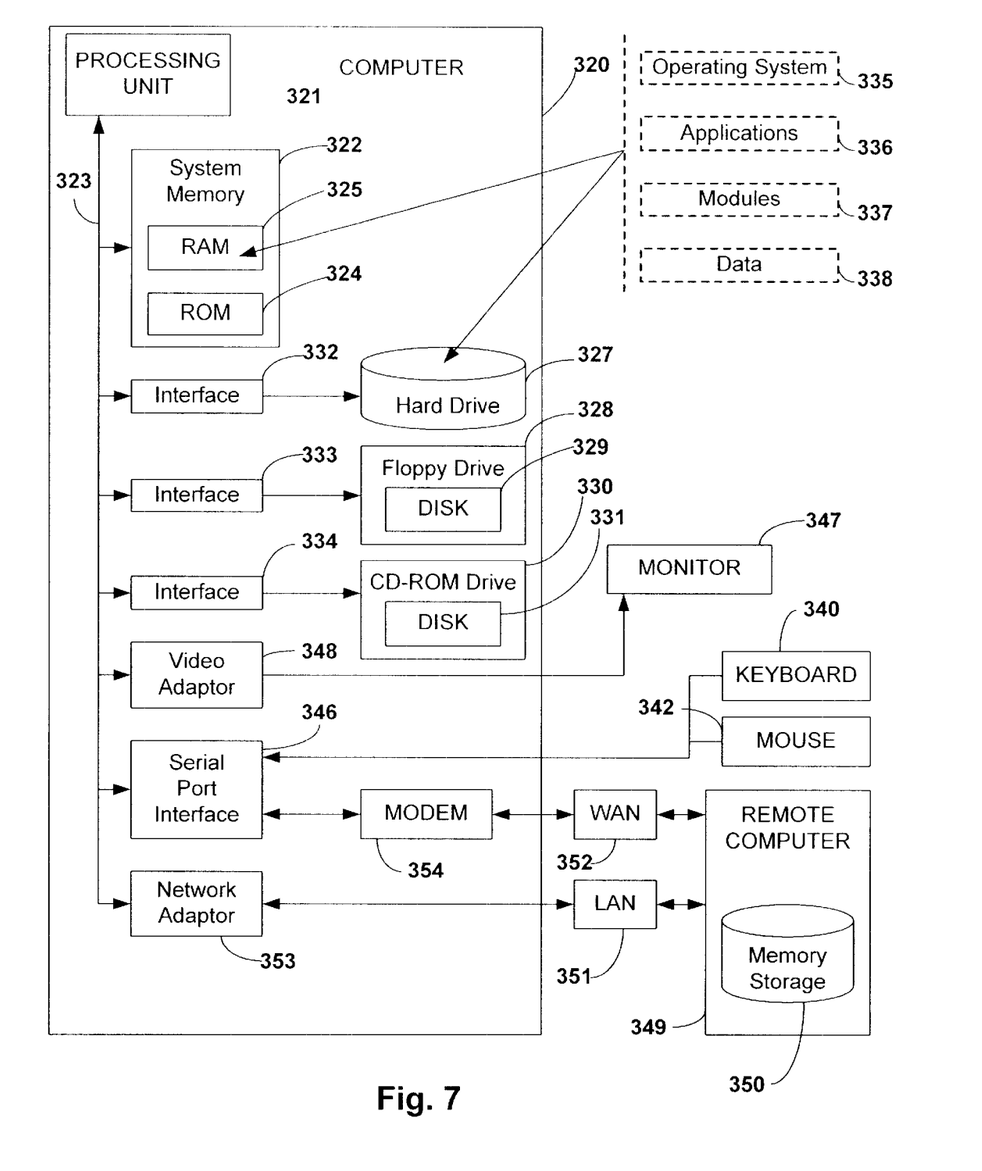
FIG. 7 is a schematic block diagram illustrating an exemplary operating environment in which one or more aspects of the invention may be implemented.

With reference to FIG. 7, an exemplary system for implementing the invention includes a conventional personal or server computer 320, including a processing unit 321, a system memory 322, and a system bus 323 that couples various system components including the system memory 322 to the processing unit 321. The processing unit 321 can be any of various commercially available processors. Dual microprocessors and other multi-processor architectures also can be used as the processing unit 321.

System bus 323 can include a memory bus or memory controller, a peripheral bus, and a local bus using any of a variety of commercially available bus architectures. The system memory 322 includes read only memory (ROM) 324 and random access memory (RAM) 325. A basic input/output system (BIOS), containing the basic routines that help to transfer information between elements within the computer 320, such as during start-up, is stored in ROM 324.

The computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the server computer 320. Although the description of computer-readable media above refers to a hard disk, a removable magnetic disk and a CD, other types of media that are readable by a computer, such as magnetic cassettes, flash memory cards, digital video disks, Bernoulli cartridges, and the like, can also be used in the exemplary operating environment. A number of program modules can be stored in the drives and RAM 325, including an operating system 335, one or more application programs 336, other program modules 337, and program data 338.

A user can enter commands and information into the computer 320 through a keyboard 340 and pointing device, such as a mouse 342. Other input devices (not shown) can include a microphone, joystick, game pad, satellite dish, scanner, or the like. These and other input devices are often connected to the processing unit 321 through a serial port interface 346 that is coupled to the system bus 323, but can be connected by other interfaces, such as a parallel port, game port or a universal serial bus (USB). A monitor 347 or other type of display device is also connected to the system bus 323 via an interface, such as a video adapter 348. In addition to the monitor, computer 320 typically includes other peripheral output devices (not shown), such as speakers and printers.

The computer 320 can operate in a networked environment using logical connections to one or more remote computers, such as a remote server or client computer 349. The remote computer 349 can be a workstation, a server computer, a router, a peer device or other common network node, and typically includes many or all of the elements described relative to the computer 320, although only a memory storage device 350 has been illustrated in FIG. 11. The logical connections depicted in FIG. 11 include a local area network (LAN) 351 and a wide area network (WAN) 352. Such networking environments are commonplace in offices, enterprise-wide computer networks, intranets and the Internet.

When used in a LAN networking environment, the computer 320 is connected to the local network 351 through a network interface or adapter 353. When used in a WAN networking environment, the server computer 320 typically includes a modem 354, or is connected to a communications server on the LAN, or has other means for establishing communications over the wide area network 352, such as the Internet. The modem 354, which can be internal or external, is connected to the system bus 323 via the serial port interface 346. In a networked environment, program modules depicted relative to the computer 320, or portions thereof, can be stored in the remote memory storage device. The network connections shown are exemplary and other means of establishing a communications link between the computers can be used.

The present invention is described with reference to acts and symbolic representations of operations that are performed by the computer 320, unless indicated otherwise. Such acts and operations are sometimes referred to as being computer-executed. These acts and operations include the manipulation by the processing unit 321 of electrical signals representing data bits which causes a resulting transformation or reduction of the electrical signal representation, and the maintenance of data bits at memory locations in the memory system (including the system memory 322, hard drive 327, floppy disks 329, and CD-ROM 331) to thereby reconfigure or otherwise alter the computer system's operation, as well as other processing of signals. The memory locations where data bits are maintained are physical locations that have particular electrical, magnetic, or optical properties corresponding to the data bits.

The present invention is illustrated with respect to a programming methodology and/or computer architecture and a particular example, however, various programming methodologies and/or computer architectures suitable for carrying out the present invention can be employed and fall within the scope of the hereto appended claims.

The invention has been described with reference to particular aspects of the invention. Obviously, modifications and alterations will occur to others upon reading and understanding the foregone detailed description. It is intended that the invention be construed as including all such modifications alterations, and equivalents thereof.

The claims are:

1. A system for generating a set of test cases, comprising:
    a component that obtains a set of variable value combinations to be included in the set of test cases, wherein the number of variables is permitted to vary among the variable value combinations; and
    a component that sequentially generates test cases to fill out the set of test cases, wherein the test cases are generated with reference to those of the variable value combinations that do not appear in any previously generated test case.

2. The system of claim 1, further comprising a component for storing the set of variable value combinations and tracking which do not appear in any previously generated test case, wherein a list of all variable combinations appearing among the variable value combinations is stored in a manner that has a storage requirement varying linearly with the number of variable combinations.

3. The system of claim 1, wherein the component for sequentially generating test cases fills out test cases by sequentially assigning values to unassigned variables in the test cases.

4. The system of claim 3, wherein the values are sequentially assigned with reference to the number of variable value combinations the values would add to those that appear in one or more test cases.

5. The system of claim 4, wherein the values are sequentially assigned with further reference to the number of the variable value combinations the values could add to those that appear in one or more test cases when the values are taken together with possible value selections for other unassigned variables.

6. The method of claim 3, wherein the values are sequentially selected with reference to a list of prohibited variable value combinations, whereby a value is not selected if it would cause a test case to include a prohibited variable value combination.

7. The system of claim 3, wherein the first variables values assigned in a new test case are values for a variable combination having the largest number of variable value combinations that are in the set of variable value combinations but do not appear in any previously generated test case.

8. A system for generating a set of test cases, comprising:
    a component for obtaining a set of variable value combinations to be included in the set of test cases, wherein the number of variables is permitted to vary among the variable value combinations; and
    means for generating a near minimal set of test cases that includes every member in the set of variable value combinations.

9. The system of claim 8, wherein the means for generating a near minimal set of test cases comprises means for generating a near minimal set of test cases when the test cases are required to include seed and/or partial seed cases in addition to the set of variable value combinations.

10. A computer readable medium having computer executable instructions for performing steps comprising:
    obtaining a set of variable value combinations to be included in the set of test cases, wherein the number of variables is permitted to vary among the variable value combinations; and
    sequentially generating test cases to fill out the set of test cases, wherein the test cases are generated with reference to those of the variable value combinations that do not appear in any previously generated test case.

11. A computer-readable medium having stored thereon a data structure for use in generating sets of test cases for systems having a plurality of independent variables, the data structure comprising a list of combination structures, wherein each combination structure comprises a structure for identifying independent variables to which the combination structure corresponds.

12. The computer readable medium of claim 11, wherein the combination structures further comprise structures for identifying variable value combinations to be tested.

13. The computer readable medium of claim 12, wherein the combination structures further comprise a structure for indicating for each variable value combination whether the variable value combination has been embodied in a test case.

14. The computer readable medium of claim 11, wherein:
    the data structure further comprises a list of variable structures; corresponding to the independent variables; and
    the variable structures comprise structures for identifying which combinations include the corresponding independent variable.

15. A computer-readable medium having stored thereon a data structure defining a set of test cases, the data structure comprising:

a list of test cases, with elements identifying independent variables values for each test case;

wherein the test cases comprise a set of test cases of the type obtained by sequentially generating test cases with reference to a set of variable value combinations, some of which have greater numbers of variables than others, and with reference to those of the variable value combinations that do not appear in any previously generated test case so as generate a near minimal set of test cases including each of the variable value combinations.

16. A process for developing a system, comprising:

generating a set of test cases with the system of claim 1;

identifying errors by testing a preliminary version of the system with the set of test cases; and preparing a new version of the system by correcting the errors identified in the preliminary version of the system.

17. The process of claim 16, wherein the system has independent variables comprises a first set of independent variables and a second set of independent variables and generating a set of test cases with the system of claim 1 comprises:

specifying a first set of variable value combinations, all the variable value combinations in the first set comprising at least one variable from the first set of independent variables;

generating seed cases with the system of claim 1 employing the first set of independent variable value combinations as input;

specifying a second set of variable value combinations comprising combinations of variables from the second set of independent variables; and generating the set of test cases with the system of claim 1 employing the seed cases and the second set of variable value combinations as input.

18. A method of obtaining a set of test cases, comprising:

submitting to a remote location specifications for a set of variable value combinations to be included in the set of test cases, wherein the specifications require some of the variable value combinations to have greater numbers of variables than others of the variable value combinations; and receiving the set of test cases from the remote location;

wherein the set of test cases is of the type obtained by sequentially generating test cases with reference to those of the variable value combinations that do not appear in any previously generated test case.

19. The method of claim 18, wherein receiving the set of test cases from the remote location takes place electronically.

20. A method for generating a set of test cases, comprising:

obtaining a set of variable value combinations to be included in the set of test cases, wherein the number of variables is permitted to vary among the variable value combinations; and sequentially generating test cases to fill out the set of test cases, wherein the test cases are generated with reference to a list identifying those of the variable value combinations that do not appear in any previously generated test case.

21. The method of claim 20, further comprising storing the set of variable value combinations and tracking which appear in one or more previously generated test cases, wherein a list of all variable combinations appearing among the variable value combinations is stored in a manner that has a storage requirement varying linearly with the number of variable combinations.

22. The method of claim 20, wherein sequentially generating test cases to fill out the set of test cases comprises sequentially selecting values for unassigned variables in the test cases.

23. The method of claim 22, wherein the values are sequentially selected with reference to the number of variable value combinations the values would add to those that appear in one or more test cases.

24. The method of claim 23, wherein the values are sequentially selected with further reference to the number of the variable value combinations the values could add to those that appear in one or more test cases when the values are taken together with possible value selections for other unassigned variables.

25. The method of claim 22, wherein the first variables values determined in a new test case are values for a variable combination having the largest number of variable value combinations that are in the set of variable value combinations but do not appear in any previously generated test case.

26. The method of claim 23, wherein the values are sequentially selected with further reference to a list of prohibited variable value combinations, whereby a value is not selected if it would cause a test case to include a prohibited variable value combination.

27. A system for generating a set of test cases, comprising:

means for obtaining a set of variable value combinations to be included in the set of test cases, wherein the number of variables is permitted to vary among the variable value combinations; and means for sequentially generating test cases to fill out the set of test cases, wherein the test cases are generated with reference to those of the variable value combinations that do not appear in any previously generated test case.

* * * * *